United States Patent
Khlifi

(10) Patent No.: US 11,822,008 B2
(45) Date of Patent: Nov. 21, 2023

(54) MOTOR VEHICLE HAVING AN OUTER SURFACE, AND METHOD FOR OPERATING A MOTOR VEHICLE

(71) Applicant: Audi AG, Ingolstadt (DE)

(72) Inventor: Rachid Khlifi, Garching (DE)

(73) Assignee: AUDI AG, Ingolstadt (DE)

( * ) Notice: Subject to any disclaimer, the term of this patent is extended or adjusted under 35 U.S.C. 154(b) by 553 days.

(21) Appl. No.: 16/844,264

(22) Filed: Apr. 9, 2020

(65) Prior Publication Data
US 2020/0355795 A1 Nov. 12, 2020

(30) Foreign Application Priority Data
May 6, 2019 (DE) .......................... 102019206480.9

(51) Int. Cl.
| | | |
|---|---|---|
| *G01S 7/48* | (2006.01) | |
| *G01S 17/931* | (2020.01) | |
| *B60C 19/00* | (2006.01) | |
| *B60R 1/12* | (2006.01) | |
| *B60R 19/48* | (2006.01) | |
| *G01S 17/10* | (2020.01) | |

(52) U.S. Cl.
CPC .............. *G01S 7/4802* (2013.01); *B60R 1/12* (2013.01); *B60R 19/483* (2013.01); *G01S 7/4808* (2013.01); *G01S 17/10* (2013.01); *B60C 19/00* (2013.01); *B60R 2001/1223* (2013.01); *G01S 17/931* (2020.01)

(58) Field of Classification Search
CPC ..... G01S 7/4802; G01S 7/4804; G01S 7/4808
See application file for complete search history.

(56) References Cited

U.S. PATENT DOCUMENTS

| | | | | |
|---|---|---|---|---|
| 4,289,376 A | * | 9/1981 | Vukadinovic | G02B 5/12 359/524 |
| 4,366,530 A | * | 12/1982 | Milhous | B60H 1/26 362/543 |
| 5,055,347 A | * | 10/1991 | Bacon, Jr. | B60C 13/001 442/295 |
| 5,642,869 A | * | 7/1997 | Miller | G05D 1/0244 340/942 |
| 5,673,049 A | * | 9/1997 | Kitchen | H01Q 1/3275 342/6 |
| 9,039,209 B1 | * | 5/2015 | Johnston | G02B 5/136 359/515 |
| 9,056,395 B1 | * | 6/2015 | Ferguson | B60W 30/16 |
| 10,215,860 B2 | | 2/2019 | Hassenpflug et al. | |
| 11,417,111 B2 | * | 8/2022 | Aceti | G06V 10/143 |
| 2003/0133193 A1 | * | 7/2003 | Martinez | B60C 13/001 359/515 |

(Continued)

FOREIGN PATENT DOCUMENTS

| | | |
|---|---|---|
| DE | 19756706 A1 | 6/1999 |
| DE | 19939048 A1 | 2/2001 |

(Continued)

*Primary Examiner* — Eric L Bolda
(74) *Attorney, Agent, or Firm* — Sterne, Kessler, Goldstein & Fox P.L.L.C.

(57) ABSTRACT

A motor vehicle is disclosed. The motor vehicle includes a light detection and ranging (lidar) sensor and an outer surface of the motor vehicle. The outer surface includes at least one retroreflector element for the lidar sensor arranged on the outer surface of the motor vehicle.

20 Claims, 2 Drawing Sheets

(56) References Cited

U.S. PATENT DOCUMENTS

| | | | |
|---|---|---|---|
| 2005/0093735 A1* | 5/2005 | Samukawa | B60T 7/22 340/436 |
| 2010/0302639 A1* | 12/2010 | Budd | G02B 5/286 359/542 |
| 2011/0038048 A1* | 2/2011 | Kobayashi | G02B 5/128 359/537 |
| 2013/0128333 A1* | 5/2013 | Agrawal | G02F 1/161 359/267 |
| 2014/0159925 A1* | 6/2014 | Mimeault | G01S 7/484 340/935 |
| 2018/0029530 A1 | 2/2018 | Nichols et al. | |
| 2018/0081058 A1* | 3/2018 | Kalscheur | G01S 7/4802 |
| 2018/0081094 A1* | 3/2018 | Aikin | G05D 1/028 |
| 2019/0004153 A1 | 1/2019 | Kaestner et al. | |
| 2019/0079194 A1* | 3/2019 | Kuffner | G05D 1/0242 |

FOREIGN PATENT DOCUMENTS

| | | |
|---|---|---|
| DE | 102010016069 A1 | 9/2011 |
| DE | 102014223900 A1 | 5/2016 |
| DE | 102015226460 A1 | 6/2017 |
| DE | 102017010186 A1 | 4/2018 |

* cited by examiner

MOTOR VEHICLE HAVING AN OUTER SURFACE, AND METHOD FOR OPERATING A MOTOR VEHICLE

TECHNICAL FIELD

The present disclosure relates to a motor vehicle, having an outer surface, and a method for operating a motor vehicle having a light detection and ranging (lidar) sensor.

BACKGROUND

The use of lidar sensors has been proposed in modern motor vehicles, particularly with regard to autonomous driving functions. Lidar (light detection and ranging) is a method related to radar for optical distance and speed measurement, whereby an object to be measured is illuminated by pulsed laser light and the reflected pulses are measured. Information on speed and distance can be derived from consideration of runtime or Doppler effect. Distance and speed measurements form an integral part of functions for at least partially, in particular completely, automatically guiding motor vehicles. In particular, in such approaches to autonomous driving, lidar is used to detect and avoid obstacles in the area surrounding the motor vehicle, which includes not only other road users, in particular people, but also other objects, for example obstacles due to construction sites. Lidar sensor data can also be used to define one's own position in relation to other objects. Rotating lidar sensors have also already been proposed in order to be able to scan as large a proportion of the surroundings of the motor vehicle as possible.

A main functionality of lidar sensors is therefore to measure the distance to other objects in their detection area. For this purpose, the runtime needed by a directional pulse to cover the distance from the sensor to the object and back is determined. The quality of the sensor data of the lidar sensors depends substantially on the quality of the received signal. The more precisely the received signal can be determined and processed, the smaller the objects that can be reliably detected.

Dark objects are particularly problematic for lidar sensors. Since the laser power of the lidar sensors must be limited to the range that is safe for people's eyes, darker/poorly reflecting objects can only be detected with difficulty at relevant distances. Another problem with using lidar sensors is the increase in possible interference. If, for example, several motor vehicles equipped with lidar sensors meet at an intersection, there may be problems in distinguishing the reception signals generated by reflections of their own transmission signals from other signals. Direct sunlight can also blind lidar sensors.

With regard to the use of lidar sensors, it would also be desirable to be able to better determine the amount of other motor vehicles or road users. The dimensions and orientation of other road users play an important role in determining and evaluating the probability of collisions. For example, dimensions and/or orientations of other road users are used to determine evasion trajectories that avoid a collision. Depending on the criticality of an unavoidable collision, various safety systems of the motor vehicle can be preconditioned or activated, for example airbag systems, hazard warning systems, window locking systems, belt tensioning systems and the like. The triggering strategy depends heavily on the quality of the measurement of the amount of other road users, especially other motor vehicles.

DE 197 56 706 A1 relates to a device and a method for the detection and identification of people, vehicles and signs. It is assumed that systems based on ultrasound, lidar and video that were previously used to monitor the surroundings of vehicles cannot distinguish between people and vehicles that are particularly endangered and those that are not particularly endangered. It is therefore proposed there to mark endangered people and vehicles with a reflector that only reflects the light of at least one specific wavelength range, preferably in the infrared range. To detect these reflectors, light emitters attached to a vehicle emit a light that is modulated in intensity with at least two light wavelengths, wherein light sensors on the vehicle detect the reflected light and, by means of an evaluation unit based on the intensity and intensity distribution, the presence of people, vehicles and signs that are equipped with such a reflector, can be determined. A new type of infrared sensor system will therefore be installed there.

DE 199 39 048 A1 relates to a device for recognizing people in traffic. Each of the people should be equipped with a reflector, wherein the light reflected by the reflector should contain a light pattern that differs so significantly from the ambient light that an evaluation device can check the signal supplied by a video sensor to determine whether such a standardized reflector is in the monitored area. In this way, a person in the danger zone of a vehicle can be recognized and, if necessary, a warning signal or another emergency function can be triggered.

DE 10 2017 010 186 A1 relates to a method for detecting vehicles. The vehicles have a reflector attached to the respective vehicle and having characteristic reflection properties for the respective vehicle class. It should be possible to determine the position and type of the vehicle simply and reliably by means of an active environment sensor. If there are several reflectors, the direction of travel or orientation can also be recognized. A radar sensor from the environment sensor is used.

BRIEF DESCRIPTION OF DRAWINGS/FIGURES

DETAILED DESCRIPTION

Figure 1:
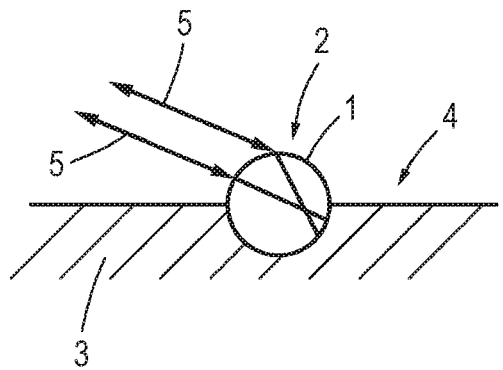
FIG. 1 shows embedding and functioning of a reflective bead in a surface material, in accordance with some embodiments.

The object of the present disclosure is to specify a possibility for improving the detectability of motor vehicles, in particular with regard to at least partially automatic vehicle guidance functions.

To achieve this object, in some embodiments, it is provided that in a motor vehicle of the type mentioned at the outset, that at least one retroreflector element for a lidar sensor is arranged on the outer surface of the motor vehicle.

Accordingly, the visibility of motor vehicles may be improved for lidar sensors by improving the reflectivity of one's own motor vehicle by integrating retroreflector materials or elements on the surface of the motor vehicle. By way of a non-limiting example, at least one of the retroreflector elements is a reflective bead embedded in a surface material of the outer surface. However, other retroreflective elements that can be integrated into surface materials are also conceivable. However, so-called reflective beads, i.e., very small glass spheres, are known, for example, from their use in road markings and can also be used for motor vehicles in order to massively increase the reflectivity of the motor vehicle for lidar systems.

In some embodiments, the surface material, which can then also serve as a binder, can be mixed at least locally with reflective beads, in larger quanitites, for example, in the range of several thousand reflective beads per square meter. In the case of correctly embedded reflective beads, these have an effect of concentrating incoming light and reflecting it on the rear face embedded in the surface material. Such reflective beads are inexpensive to produce and obtain. Reflective beads can have a diameter in the range from 60 μm to 850 μm, for example, the best efficiency being achieved with an embedding of 50% to 60%. The refractive index is a measure of the quality of the reflective beads, since the higher the refractive index, the more light is reflected.

In some embodiments, by way of a non-limiting example, a large number of reflective beads locally forming a lidar marker may be embedded in the surface material. For example, provision can therefore be made to define certain areas of the outer surface of the motor vehicle in advance and to introduce the reflective beads only in these areas in order to specifically produce lidar markers there of specific shape/dimensions. For a lidar sensor, these lidar marker areas appear extremely bright and clearly distinguishable from other areas of the outer surface of the motor vehicle, in particular those not provided with retroreflector elements, due to the massive increase in the reflection of the laser light. By way of a non-limiting example, the surface material can comprise plastic and/or paint. It is therefore conceivable, for example, to integrate microscopic glass spheres as reflective beads in the paint or in plastic parts of the motor vehicle, such as bumpers, mirrors, glass and the like, in order to massively increase the reflectivity of the motor vehicle for lidar sensors.

By the provision of retroreflector elements, a larger proportion of the transmission signal is reflected back to the lidar sensor, so that a reception signal of higher quality is produced, which can be processed better. In this way, the resolution of lidar sensors with respect to the motor vehicles is significantly increased. Furthermore, darker objects, for example, motor vehicles with dark paint, can be detected much better by lidar sensors. There is also a significant improvement with regard to possible interference, since retroreflector elements reflect the majority of the incoming transmission signal back as a reception signal in the direction of arrival, so that their own measurement signals are received back significantly more strongly than reception signals.

In some embodiments, by way of a non-limiting example, lidar markers are not required to be formed in all configurations on the motor vehicle. Integrating microscopic retroreflector elements such as reflective beads or retroreflective pigments as a whole into the paint of the motor vehicle, for example, in the case of a dark paint finish on the motor vehicle, may significantly improve the visibility of the motor vehicle as a whole by means of lidar sensors. In other words, this does not exclude the use of special lidar markers on the motor vehicle, since, for example, sufficiently different concentrations of retroreflector elements can be used.

In some embodiments, at least one of the at least one reflector element is embedded in a tire of the motor vehicle, in particular not comprising the entire tire and/or forming an essentially punctiform, for example, point-shaped and/or trackable lidar marker. The tire material is usually very highly absorbent for the laser light from the lidar sensors, so that tires (and therefore usually also wheels themselves) cannot be recognized by lidar sensors. However, by the use of retroreflector elements on the tire surface, not only can the recognition of the wheels of the motor vehicle be significantly improved, but it is also possible, with a local configuration as a trackable lidar marker, to detect the rotation of the tires based on the tracking of the punctiform, retroreflector elements in the tires. As a result, with a pulsed lidar sensor the visibility of the tires of the motor vehicle can be increased for lidar sensors and the rotational speed of the tires, and the speed of the motor vehicle can be measured. For this purpose, by way of anon-limiting example, the retroreflector elements, such as reflective beads, can be embedded in the plastic of the tire.

In some embodiments, a predefined number of trackable lidar markers is provided, for example, equidistantly, on each tire of the motor vehicle. For example, a lidar marker at a spacing of 90° along the circumference of each tire may be provided by a large number of retroreflector elements, so that there are four equidistant lidar markers per tire, which also characterizes the tire itself as such on the basis of the reflection pattern obtained. Accordingly, all tires can be detected and identified. Further, from mutual plausibility checks or statistical combinations with regard to a speed measurement in combination with a knowledge of the position and possibly orientation of several tires, an orientation of the motor vehicle can also be determined by an external lidar sensor.

In some embodiments, the arrangement and/or the shape of at least one lidar marker formed from at least one reflector element is selected for providing information. For example, when evaluating the sensor data of a receiving lidar sensor, a shape and/or relative arrangement with respect to other lidar markers may be used to determine where the corresponding lidar marker is arranged on the motor vehicle, although further information can also be provided, for example with regard to the vehicle class, the vehicle type and the like. In other words, the specific attachment and distribution/shaping of the retroreflector elements on the motor vehicle can be used to derive further information about the motor vehicle when evaluating sensor data from a monitoring lidar sensor.

In some embodiments, by way of a non-limiting example, the shape may include lettering and/or a bar code and/or a QR code or is otherwise machine-readable. In an evaluation, such clearly visible lettering or machine-readable codes can be easily understood and used by a measuring lidar sensor or a control device evaluating the sensor data thereof. Such a concept can also be easily transferred to other objects that are detectable in road traffic, for example, objects in parking environments, in particular parking garages, where, for example, lettering can be realized with characters formed from retroreflector elements embedded in particular on the surface.

In some embodiments, the arrangement of at least some of the plurality of lidar markers is selected to enable determination of the dimensions and/or the orientation of the motor vehicle. In other words, distribution of the retroreflector elements or the lidar markers formed by them, a measurement of the extent of the motor vehicle, in particular width, height and depth, can be made by direct, and clear reflection.

Not only can the measurement of the dimensions of the motor vehicle be improved based on various embodiments as described herein, but also the orientation of the motor vehicles, for example, during an overtaking maneuver or when pulling in or out, can be determined on the basis of the clear reflections on the lidar markers.

In some embodiments, by way of a non-limiting example, to determine the dimensions and/or the orientation of the motor vehicle at least one lidar marker that is elongated and/or continuous is provided along a front and/or rear side of at least one bumper of the motor vehicle, for example, on the lower edge thereof, and/or at least one lidar marker, for example, elongated and/or continuous, is provided along an upper edge of a front and/or rear side of the motor vehicle, and/or at least one lidar marker is provided on the exterior mirrors of the motor vehicle, and/or at least one lidar marker is provided at the upper edge of side surfaces of the motor vehicle, for example, at the upper end of a B-pillar of the motor vehicle. If all of these lidar markers are provided, the lidar markers running along the front and rear sides possibly being slightly extended to the side, dimensions and orientations of the motor vehicle can be determined by evaluating sensor data from a lidar sensor measuring the motor vehicle. Of course, other approaches in this regard are also conceivable.

In some embodiments, a motor vehicle with at least one lidar sensor and a control device for evaluating sensor data of the lidar sensor is disclosed. The control device for evaluating the sensor data of the lidar sensor may be configured for detecting lidar markers of another motor vehicle formed from at least one reflector element, and for determining a dimension and shape of the other motor vehicle from the position of the detected lidar markers and/or for determining a speed of the other motor vehicle based on tracked lidar markers located on tires of the other motor vehicle. As described above, the motor vehicle can have at least one retroreflector element for a radar sensor even on its outer surface, so that motor vehicles that are fully equipped with a control device and retroreflector elements can detect and measure one another in an improved manner.

In other words, by increasing the reflectivity for lidar sensors, one's own motor vehicle can be better detected and recognized by third-party lidar systems, and sensor data of one's own lidar sensor with respect to other motor vehicles can also be better evaluated by providing the correspondingly designed control device.

In some embodiments, the control device can be associated with a vehicle system of the motor vehicle that is designed for fully automatic vehicle guidance and can be designed to use at least one evaluation result relating to the other motor vehicle in the completely automatic operation of one's own motor vehicle. The configuration according to various embodiments as described herein can thus be used for at least partial or completely automatic vehicle guidance functions for autonomous driving. For example, in the event of a critical traffic situation, the lidar sensor carrier can better recognize the other motor vehicle with built-in retroreflector elements and can more precisely determine the relative positioning of its own motor vehicle. In this way, for example, evasion trajectories can be calculated more quickly and more precisely and/or collision probabilities can be determined more precisely. Furthermore, incorrect or missing triggers in assistance functions and automated driving functions can be reduced, so that overall a massive reduction in error rates can also be achieved.

Further advantages and details of the present disclosure will become apparent from the exemplary embodiments described below and with reference to the drawings.

FIG. 1 shows embedding and functioning of a reflective bead in a surface material, in accordance with some embodiments. FIG. 1 shows the embedding of a reflective bead 1 as a retroreflector element 2 in a surface material 3 of an outer surface 4 of a motor vehicle according to various embodiments, as described above. The surface material 3 can be plastic or paint, for example. As described above, the reflective beads 1 can be introduced into the motor vehicle prior to the application of the surface material 3 or, as it were, can also be scattered on after the application, as long as the surface of the surface material 3 has not yet hardened. The reflective beads 1 are glass spheres that can have a diameter in the range from 60 to 850 µm, for example, and ultimately work on the principle of a Lüneburg lens. Incident light, as indicated by the double arrows 5, is reflected back in the same direction due to the refraction and reflection properties inside the reflection bead 1.

In accordance with some embodiments, a lidar marker can be created by using a large number of such reflective beads 1 in a predefined area.

Figure 2:
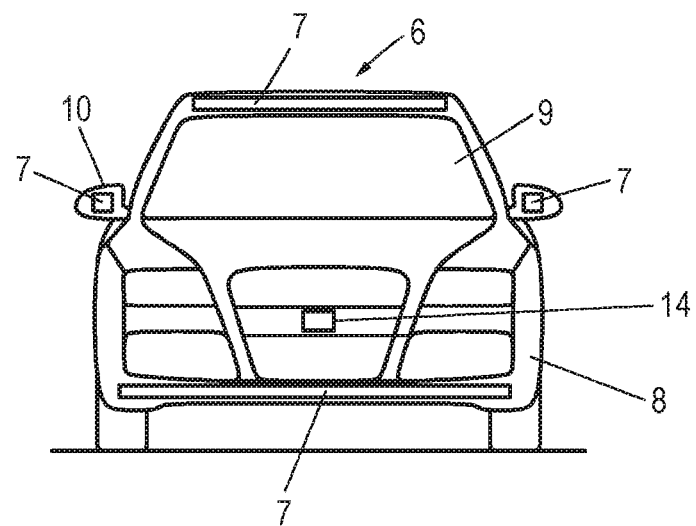
FIG. 2 shows a motor vehicle, in accordance with some embodiments.
Figure 3:
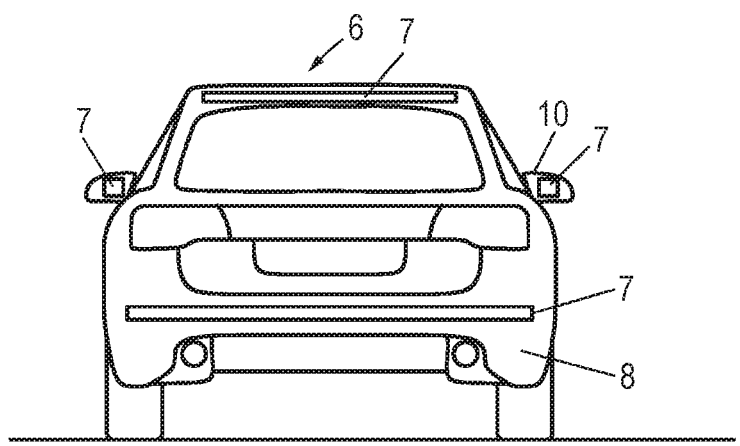
FIG. 3 shows a rear view of the motor vehicle, in accordance with some embodiments.
Figure 4:
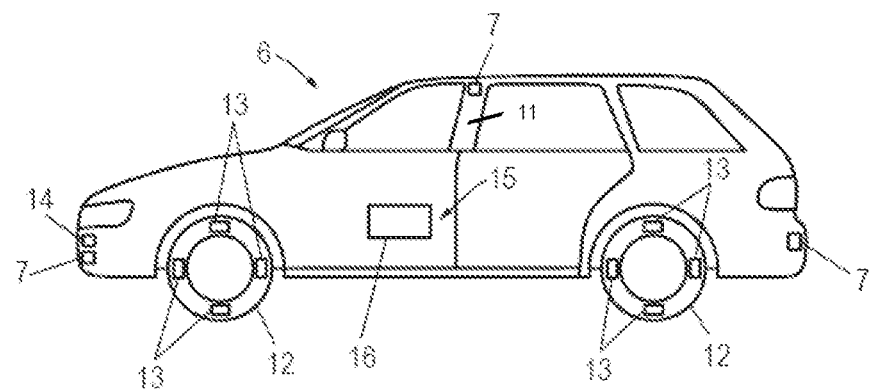
FIG. 4 shows a side view of the motor vehicle, in accordance with some embodiments.

FIG. 2 through FIG. 4 show a first exemplary embodiment of a motor vehicle 6 according to various embodiments, as described above. FIG. 2 shows a front view of various lidar markers 7 formed from retroreflector elements 2, one of the lidar markers 7 at the lower edge of a bumper 8 extending over the entire width of the motor vehicle 6, another at the upper edge of a windshield 9, and two further lidar markers 7 on the exterior mirrors 10. As can be seen from the rear view in FIG. 3, a comparable picture results from there. It can also be seen from the side view of FIG. 4 that a lidar marker 7 is also arranged at the upper end of the B-pillar 11.

FIG. 4 also shows that the tires 12 of the motor vehicle 6 are also provided with lidar markers 13 in that retroreflector elements 2 are embedded in the tire rubber, for example, as surface material 3. It can be seen that four spatially clearly separated, equidistant lidar markers 13 are used. The tires 12 can thus be recognized in the sensor data of a measuring lidar sensor; in addition, the lidar markers 13 are trackable, so that a rotational movement of the wheel can be ascertained and a speed of the motor vehicle 6 can be determined therefrom.

In accordance with some embodiments, the arrangement of the lidar markers 7 is selected such that, in particular when viewed together with the lidar markers 13, dimensions of the motor vehicle 6 can be determined from sensor data of a measuring lidar sensor. For example, the maximum width results from the horizontal spacing between the lidar markers 7 of the exterior mirrors 10; the height can be determined at least using the lidar marker 7 arranged on the upper edge of the front surface or rear surface. It should be noted that, even if this is not shown in FIG. 4 for the sake of clarity, the lidar markers 7 arranged on the bumpers 8 can also run piece by piece up to the side surface, so that a length determination is made possible here. However, as indicated in FIG. 4, additional corresponding lateral lidar markers 7 are also possible.

In accordance with some embodiments, the motor vehicle 6 may have at least one lidar sensor 14, the sensor data of which are evaluated by a control device 15, which here is assigned to a vehicle system 16 which is designed for the fully automatic control of the motor vehicle 6. The control device 15 is therefore designed to detect lidar markers 7, 13 of another motor vehicle, and in the case of lidar markers 13 also to track them, in order to be able to determine the speed and dimensions of the other motor vehicle.

Figure 5:
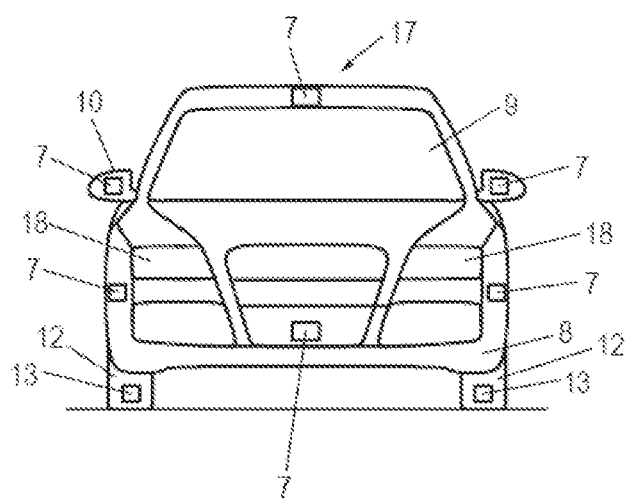
FIG. 5 shows a front view of a motor vehicle, in accordance with some embodiments.

FIG. 5 shows a front view of a second exemplary embodiment of a motor vehicle 17, in accordance with some embodiments. In contrast to the motor vehicle 6, the lidar markers 7 provided on the upper edge of the windshield 9 and on the bumper 8 are now not formed over the entire length, but are provided in the center. Additional lidar markers 7 are located somewhat below the headlights 18. Furthermore, the treads of the tires 12 are provided with lidar markers 13 in the present case.

The invention claimed is:

1. A motor vehicle, comprising:
   a light detection and ranging (lidar) sensor;
   an outer surface comprising:
   a plurality of microscopic retroreflector elements locally embedded in a surface material of the outer surface covering a body of the motor vehicle,
   wherein the surface material serves as a binder for the plurality of microscopic retroreflector elements; and
   a control device configured to:
   evaluate sensor data of the lidar sensor;
   based on the evaluation of the sensor data, detect a lidar marker formed from at least one retroreflector element of another motor vehicle; and
   determine a dimension and a shape of the other motor vehicle from a position of the detected lidar marker.

2. The motor vehicle of claim 1, wherein at least one microscopic retroreflector element of the plurality of microscopic retroreflector elements is a reflective bead embedded in a surface material of the outer surface.

3. The motor vehicle of claim 2,
   wherein a plurality of reflective beads are embedded in the surface material of the outer surface,
   wherein the plurality of reflective beads are forming a lidar marker, and
   wherein the surface material further comprises plastic and/or paint.

4. The motor vehicle of claim 1, wherein at least one retroreflector element is embedded in at least a partial portion of a tire of the motor vehicle.

5. The motor vehicle of claim 4, wherein the at least one retroreflector element is forming a punctiform or a trackable lidar marker.

6. The motor vehicle of claim 1, further comprising a predefined number of trackable lidar markers arranged equidistantly on each tire of the motor vehicle.

7. The motor vehicle of claim 1, further comprising at least one lidar marker formed from the at least one retroreflector element, wherein the at least one lidar marker is adapted to provide information using an arrangement and/or a shape of the at least one lidar marker.

8. The motor vehicle of claim 7, wherein the information comprises a vehicle class, and/or a vehicle type.

9. The motor vehicle of claim 7, wherein the shape of the at least one lidar marker is formed using lettering.

10. The motor vehicle of claim 7, wherein an arrangement of at least part of a plurality of lidar markers is adapted to enable a determination of dimensions or an orientation of the motor vehicle.

11. The motor vehicle of claim 1, further comprising at least one lidar marker along a lower edge of a front or rear side of at least one bumper of the motor vehicle, wherein the at least one lidar marker is elongated and/or continuous.

12. The motor vehicle of claim 1, further comprising at least one lidar marker along a front or rear side of at least one bumper of the motor vehicle, wherein the at least one lidar marker is elongated and/or continuous.

13. The motor vehicle of claim 1, further comprising at least one exterior mirror; and at least one lidar marker on the at least one exterior mirror of the motor vehicle.

14. The motor vehicle of claim 1, further comprising at least one lidar marker at an upper edge of a side surface of the motor vehicle.

15. The motor vehicle of claim 1, wherein the control device is further configured to:
   track a plurality of lidar markers located on a plurality of tires of the other motor vehicle; and
   determine a speed of the other motor vehicle based on tracking of the plurality of lidar markers of the other motor vehicle.

16. The motor vehicle of claim 1, wherein the motor vehicle is designed for fully automatic vehicle guidance, and wherein the control device is further configured to use at least one evaluation result related to the other motor vehicle for the fully automatic vehicle guidance of the motor vehicle.

17. A control device of a motor vehicle, the control device configured to:
   evaluate sensor data of a light detection and ranging (lidar) sensor of the motor vehicle;
   based on the evaluation of the sensor data, detect a lidar marker formed from a plurality of microscopic retroreflector elements of another motor vehicle, wherein the plurality of microscopic retroreflector elements are locally embedded in a surface material of an outer surface covering a body of the other motor vehicle, and
   wherein the surface material serves as a binder for the plurality of microscopic retroreflector elements; and
   determine a dimension and a shape of the other motor vehicle from a position of the detected lidar marker.

18. The control device of claim 17, further configured to:
   track a plurality of lidar markers located on a plurality of tires of the other motor vehicle; and
   determine a speed of the other motor vehicle based on tracking of the plurality of lidar markers of the other motor vehicle.

19. The control device of claim 17, further configured to use at least one evaluation result related to the other motor vehicle for fully automatic vehicle guidance of the motor vehicle.

20. The motor vehicle of claim 1, further comprising at least one headlight and at least one lidar marker below the at least one headlight of the motor vehicle.

* * * * *